United States Patent
Jeong et al.

(10) Patent No.: US 10,718,977 B2
(45) Date of Patent: Jul. 21, 2020

(54) LIQUID CRYSTAL DISPLAY

(71) Applicant: Samsung Display Co., Ltd., Yongin, Gyeonggi-Do (KR)

(72) Inventors: Youn Hak Jeong, Cheonan-si (KR); Wan Namgung, Asan-si (KR); Hong Min Yoon, Seoul (KR); Ho Jun Lee, Asan-si (KR); Pil Gyu Kang, Yongin-si (KR); Seung Kyu Lee, Cheonan-si (KR); Yun Seok Lee, Asan-si (KR)

(73) Assignee: Samsung Display Co., Ltd. (KR)

( * ) Notice: Subject to any disclaimer, the term of this patent is extended or adjusted under 35 U.S.C. 154(b) by 56 days.

(21) Appl. No.: 14/815,443

(22) Filed: Jul. 31, 2015

(65) Prior Publication Data
US 2016/0202565 A1    Jul. 14, 2016

(30) Foreign Application Priority Data

Jan. 9, 2015    (KR) .................. 10-2015-0003670

(51) Int. Cl.
*G02F 1/1339*    (2006.01)
*G02F 1/1343*    (2006.01)
*G02F 1/1337*    (2006.01)

(52) U.S. Cl.
CPC .... *G02F 1/133707* (2013.01); *G02F 1/13394* (2013.01); *G02F 2001/13396* (2013.01);
(Continued)

(58) Field of Classification Search
CPC ......... G02F 1/133345; G02F 1/133711; G02F 1/13394; G02F 1/1337; G02F 2001/133726; G02F 2001/13396; G02F 2201/567; G02F 1/136213; G02F 2201/121; G02F 1/133305; G02F 2201/56; G02F 1/1339; G02F 1/161; G02F 2001/13398; G02F 2201/123; G02F 2201/124; H01L 27/1255; G09G 2300/0876
(Continued)

(56) References Cited

U.S. PATENT DOCUMENTS 5,469,280 A * 11/1995 Jang ..................... G02F 1/1341
349/138
6,661,488 B1    12/2003 Takeda et al.
(Continued)

FOREIGN PATENT DOCUMENTS

KR    10-2011-0111227 A    10/2011
KR    10-2013-0101325 A    9/2013
KR    10-2013-0125638 A    11/2013

*Primary Examiner* — Angela K Davison
(74) *Attorney, Agent, or Firm* — Innovation Counsel LLP

(57) ABSTRACT

A liquid crystal display according to an exemplary embodiment of the present system and method includes a first insulation substrate, a thin film transistor disposed on the first insulation substrate, a pixel electrode connected to the thin film transistor, a protrusion disposed on the pixel electrode, a second insulation substrate facing the first insulation substrate, a common electrode disposed on the second insulation substrate, and a liquid crystal layer disposed between the pixel electrode and the common electrode, wherein one pixel includes a thin film transistor formation region where the thin film transistor is disposed and a display area where the pixel electrode is disposed, and the protrusion is disposed to overlay at least a portion of edges of the display area.

19 Claims, 11 Drawing Sheets

(52) U.S. Cl.
CPC ............ *G02F 2001/133726* (2013.01); *G02F 2001/134345* (2013.01)

(58) Field of Classification Search
USPC ....... 349/155–157, 123, 130, 131, 158, 160, 349/38, 39
See application file for complete search history.

(56) References Cited

U.S. PATENT DOCUMENTS

| | | | |
|---|---|---|---|
| 6,982,019 B2* | 1/2006 | Rey-Mermet | G02F 1/1341 156/145 |
| 7,999,879 B2* | 8/2011 | Yoshida | G02F 1/1393 349/129 |
| 8,379,176 B2* | 2/2013 | Kim | G02F 1/134363 349/129 |
| 9,588,390 B2* | 3/2017 | Yoshida | G02F 1/133753 |
| 2009/0015747 A1* | 1/2009 | Nishizawa | G02F 1/133308 349/58 |
| 2010/0007811 A1* | 1/2010 | Choi | G02F 1/136209 349/43 |
| 2012/0081641 A1* | 4/2012 | Noh | G02F 1/13394 349/106 |
| 2012/0099042 A1* | 4/2012 | Lee | G02F 1/13392 349/43 |
| 2012/0217514 A1* | 8/2012 | Joo | G02F 1/13394 257/88 |
| 2016/0041439 A1* | 2/2016 | Sakai | G02F 1/134363 349/43 |

* cited by examiner

LIQUID CRYSTAL DISPLAY

CROSS-REFERENCE TO RELATED APPLICATION

This application claims priority to and the benefit of Korean Patent Application No. 10-2015-0003670 filed in the Korean Intellectual Property Office on Jan. 9, 2015, the entire contents of which are incorporated herein by reference.

BACKGROUND (a) Field

The present disclosure relates to a liquid crystal display.

(b) Description of the Related Art

A liquid crystal display is a flat panel display that is widely used today, and generally includes two display panels in which electric field generating electrodes, such as a pixel electrode and a common electrode, are disposed, and a liquid crystal layer disposed between the two display panels. An image is displayed by applying a voltage to the electric field generating electrodes to generate an electric field in the liquid crystal layer, thereby determining the alignment of the liquid crystal molecules in the liquid crystal layer and controlling the polarization of incident light by the liquid crystal layer.

The liquid crystal display includes switching elements connected to respective pixel electrodes, a plurality of signal lines including gate lines and data lines, and a driver configured to apply a driving signal to the signal lines. By controlling the state of the switching elements through the gate lines, voltages may be applied to the pixel electrodes through the data lines.

The driver includes a gate driver for supplying a gate signal including a gate-on voltage Von and a gate-off voltage Voff to the gate lines of a display panel, a data driver for supplying a data signal to the data lines of the display panel, a signal controller for controlling the data driver and the gate driver, and the like.

Among liquid crystal displays, a liquid crystal display with a vertically aligned mode has proved to be popular because it provides a relatively large contrast ratio and a wide reference viewing angle. In a liquid crystal display with a vertically aligned mode, the major axis of the liquid crystal molecules are aligned to be perpendicular to a planar surface of the display panels when an electric field is not applied.

A method for forming cutouts, such as fine slits, in the field generating electrode is used to provide the wide viewing angle in the liquid crystal display with a vertically aligned mode. Since the cutouts and protrusions determine the direction in which the liquid crystal molecules are tilted (tilt direction), it is possible to increase a viewing angle by appropriately arranging the cutouts and protrusions so that the liquid crystal molecules are tilted in various directions.

The above information disclosed in this Background section is only for enhancement of understanding of the background of the system and method and therefore may contain information that does not form the prior art that is already known in this country to a person of ordinary skill in the art.

SUMMARY

The present system and method provide a liquid crystal display having advantages of minimizing optical loss and suppressing the occurrence of textures even when the display panels are misaligned with each other due to their curvature.

An exemplary embodiment of the present system and method provides a liquid crystal display including: a first insulation substrate, a thin film transistor disposed on the first insulation substrate, a pixel electrode connected to the thin film transistor, a protrusion disposed on the pixel electrode, a second insulation substrate facing the first insulation substrate, a common electrode disposed on the second insulation substrate, and a liquid crystal layer disposed between the pixel electrode and the common electrode, wherein one pixel includes a thin film transistor formation region where the thin film transistor is disposed and a display area where the pixel electrode is disposed, and the protrusion is disposed to overlay at least a portion of edges of the display area.

The pixel electrode may include a plurality of cross-shaped stems, and fine branches obliquely extending from the cross-shaped stems. The display area may comprise a plurality of sub-regions identified by the cross-shaped stems.

The protrusion may overlay at least a portion of edges of the sub-regions.

The protrusion may include an opening disposed at corners of the edges.

The protrusion may include an opening disposed at sides of the edges.

The pixel electrode may further include a plate part disposed as the center of the cross-shaped stem.

The plate part may have a diamond shape.

The liquid crystal display may further include a column spacer disposed on the pixel electrode. The column spacer and the protrusion may be disposed in the same layer and are made of the same material.

The protrusion may have a height lower than a height of the liquid crystal layer.

The common electrode may have a plate shape.

The liquid crystal display may further include alignment layers disposed on the pixel electrode and the common electrode, and the alignment layers disposed on the pixel electrode may further include reactive mesogen (RM).

The liquid crystal layer may exclude reactive mesogen (RM).

The liquid crystal display may have a curved shape.

As described above, according to the above-described liquid crystal display, it is possible to minimize optical loss and suppress occurrence of textures even when a display panel is curved and thus upper and lower panels are misaligned with each other.

DETAILED DESCRIPTION OF THE EMBODIMENTS

Figure 1:
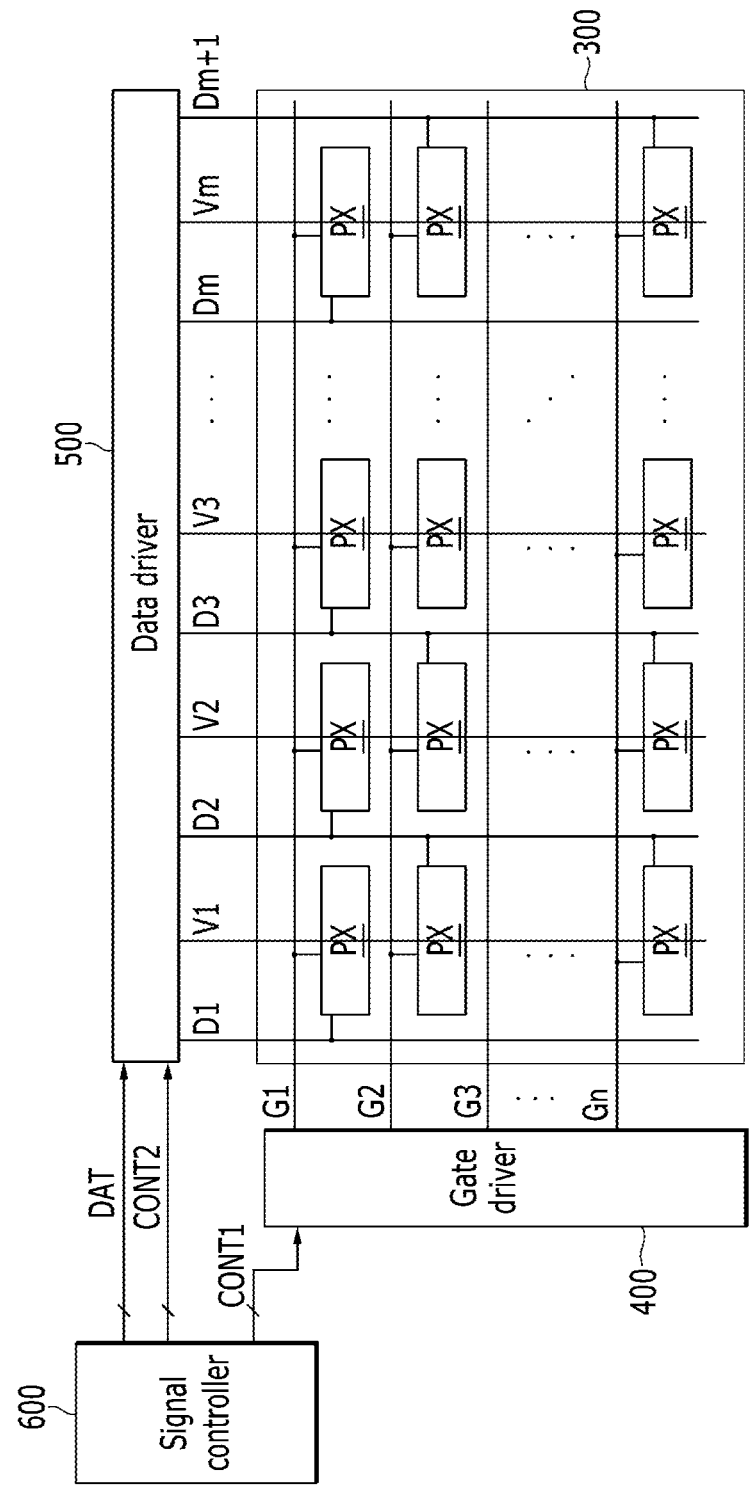
FIG. 1 is a block diagram illustrating a display device according to an exemplary embodiment of the present system and method.

The present system and method are described more fully hereinafter with reference to the accompanying drawings in which exemplary embodiments of the present system and method are shown. Those of ordinary skill in the art would realize that the described embodiments may be modified in various different ways without departing from the spirit or scope of the present system and method.

In the drawings, the thickness of layers, films, panels, regions, etc., are exaggerated for clarity. Like reference numerals designate like elements throughout the specification. When an element such as a layer, film, region, or substrate is referred to as being "on" another element, it may be directly on the other element, or intervening elements may also be present. In contrast, when an element is referred to as being "directly on" another element, there are no intervening elements present.

Hereinafter, a display device according to an exemplary embodiment is described in detail with reference to FIG. 1.

FIG. 1 is a block diagram illustrating a display device according to an exemplary embodiment of the present system and method.

As shown in FIG. 1, the display device includes a display panel 300 configured to display an image, a data driver 500 configured to drive the display panel 300, a gate driver 400, and a signal controller 600 configured to control the data driver 500 and the gate driver 400.

The display panel 300 includes a plurality of gate lines G1 to Gn and a plurality of data lines D1 to Dm+1. The plurality of gate lines G1 to Gn extend in a horizontal direction, and the plurality of data lines D1 to Dm+1, which are insulated from the plurality of gate lines G1 to Gn, extend in a vertical direction to intersect with the plurality of gate lines G1 to Gn. Also, reference voltage lines V1 to Vm that extend in a vertical line are disposed between the plurality of data lines D1 to Dm+1. The reference voltage lines V1 to Vm are insulated from and intersect with the gate lines G1 to Gn.

Each pixel of a plurality of pixels PX is connected to a corresponding one of the gate lines and a corresponding one of the data lines. The pixels PX are arranged in a matrix form and formed to extend lengthwise in the horizontal direction, which is also the extending direction of the gate lines G1 to Gn. Each pixel PX may include a thin film transistor, a liquid crystal capacitor, and a storage capacitor. A control terminal of the thin film transistor may be connected to one of the gate lines G1 to Gn, an input terminal of the thin film transistor may be connected to one of the data lines D1 to Dm+1, and an output terminal of the thin film transistor may be connected to one terminal (pixel electrode) of the liquid crystal capacitor and one terminal of the storage capacitor. The other terminal of the liquid crystal capacitor may be connected to a common electrode and the other terminal of the storage capacitor may receive a storage voltage Vcst. In some exemplary embodiments, a channel layer of the thin film transistor may be amorphous silicon, polysilicon, or an oxide semiconductor. The reference voltage lines V1 to Vm provide reference voltages to the pixels PX. The reference voltage has a voltage level that does not vary with time.

However, in some exemplary embodiments, the reference voltage may have a voltage level that varies with time.

As the exemplary liquid crystal display device of the FIG. 1 shows, one data line is alternately connected to pixels PX disposed to the right and the left of the data line. For example, when the data line is connected to a pixel PX disposed to its right in a first row, the data line is connected to a pixel PX disposed to its left in a second row, and is again connected to a pixel disposed to its right in a third row. On the other hand, one gate line is connected to all the pixels PX of one row.

In such a structure, an odd pixel and an even pixel, both belonging to one pixel column, are connected to different data lines. Thus, even when the data lines D1 to Dm+1 apply data voltages having the same polarity during one frame, a polarity reversal appearing in a pixel (PX) is represented as a dot reversal.

The number of the data lines D1 to Dm+1 may be one more than the number (m) of pixel columns. In the embodiment of FIG. 1, there is no pixel column on the left of a first data line D1, and therefore, the first data line D1 may be alternately connected to the pixel column disposed on the right thereof. There is no pixel column on the right of an (m+1)-th data line Dm+1, and therefore, the (m+1)-th data line Dm+1 may be alternately connected to the pixel column disposed on the left thereof.

The signal controller 600 processes input data and control signals that are input from the outside, so as to make them suitable for the operating conditions of the liquid crystal panel 300, in response to, for example, a vertical synchronization signal Vsync, a horizontal synchronizing signal Hsync, a main clock signal MCLK, a data enable signal DE or the like. Thereafter, the signal controller 600 generates and outputs image data DAT, a gate control signal CONT1, a data control signal CONT2, and a clock signal.

The gate control signal CONT1 may include a scanning start signal STV that indicates the start of outputting of a gate-on voltage Von, a gate clock signal CPV that controls the output timing of the gate-on voltage Von, and the like.

The data control signal CONT2 may include a horizontal synchronization start signal STH that indicates the start of inputting of image data DAT, a load signal TP that instructs application of the data voltages to the data lines D1 to Dm+1.

The plurality of gate lines G1 to Gn of the display panel 300 is connected to the gate driver 400, and the gate driver 400 sequentially receives the gate-on voltage Von according to the gate control signal CONT1 applied from the signal controller 600.

A gate-off voltage Voff is applied to the gate lines G1 to Gn during a period in which the gate-on voltage Von is not applied.

The plurality of data lines D1 to Dm+1 of the display panel 300 is connected to the data driver 500, and the data driver 500 receives the data control signal CONT2 and the image data DAT from the signal controller 600. The data driver 500 converts the image data DAT into data voltages by using gray voltages generated by a gray voltage generator (not shown) and transfers the data voltages to the data lines D1 to Dm+1. The data voltages include a positive-polarity data voltage and a negative-polarity data voltage. The positive-polarity data voltage and the negative-polarity data voltage are alternately applied based on frames, columns, or rows and are used for inversion driving. Such inversion driving is applied to either or both of the case in which a moving image is displayed and the case in which a still image is displayed.

In some exemplary embodiments, there may be provided various pixel connection structures that are not shown in FIG. 1.

A structure of two adjacent pixels PX is schematically described below with reference to FIG. 2.

Figure 2:
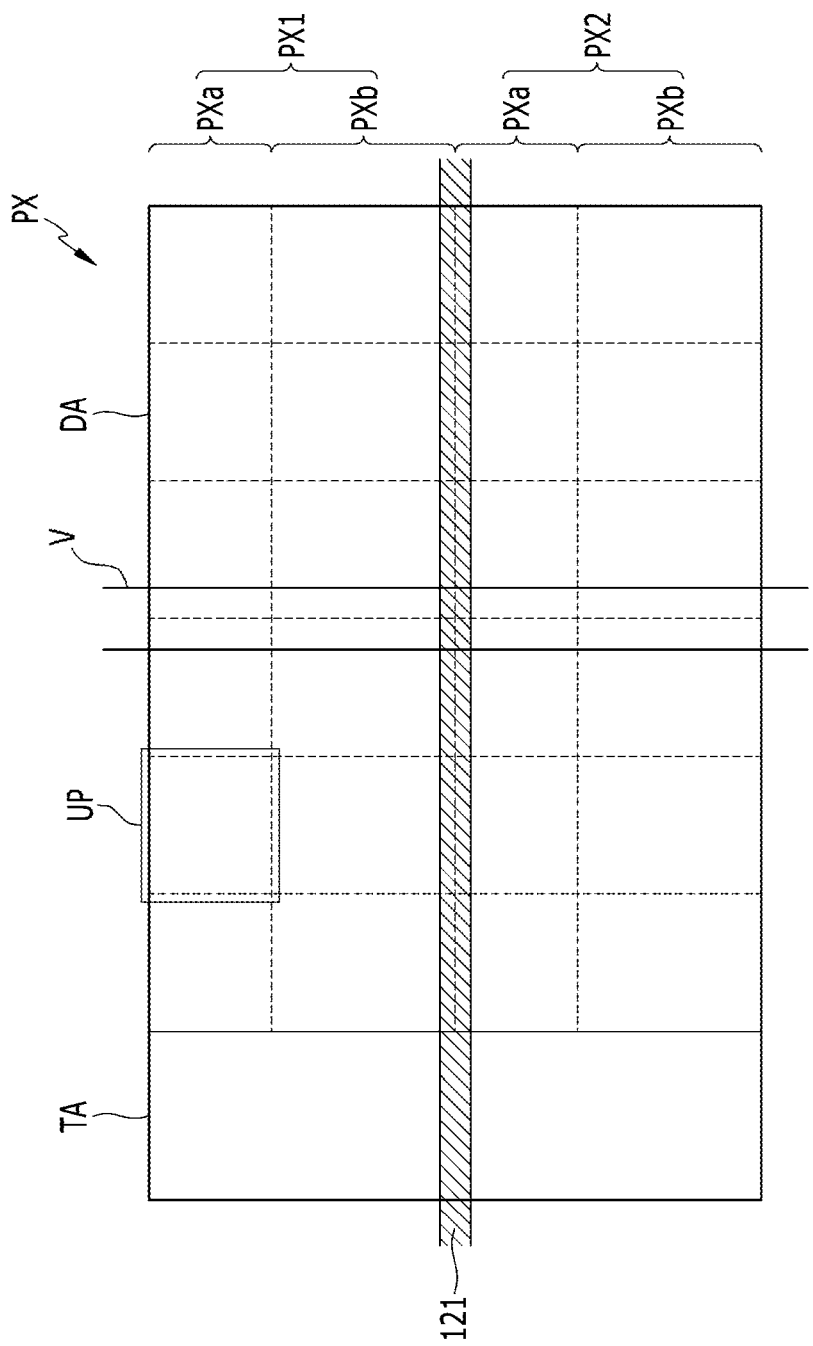
FIG. 2 is a schematic diagram of two adjacent pixels according to an exemplary embodiment of the present system and method.

FIG. 2 is a schematic diagram of two adjacent pixels according to an exemplary embodiment of the present system and method.

The pixel PX according to an exemplary embodiment of the present system and method is a horizontal pixel that is formed to extend in a horizontal direction. Also, the pixel PX mainly includes a thin film transistor formation region TA and a display area DA. A pixel electrode is disposed in the display area DA where an image is displayed through the liquid crystal molecules. An element, such as a thin film transistor that transfers a voltage to be applied to the pixel electrode in the display area DA, and wirings are formed in the thin film transistor formation region TA.

As FIG. 2 shows, a reference voltage line V is disposed in a vertical direction along the center of the display area DA. Also, each of the two adjacent pixels PX1 and PX2 includes a first subpixel area PXa and a second subpixel area PXb that are arranged in two rows.

Each of the first subpixel area PXa and the second subpixel area PXb includes six sub-regions. The sub-regions are separate from each other by dotted lines in FIG. 2. That is, each of the two pixels PX1 and PX2 includes 12 sub-regions in total. Also, the reference voltage line V is disposed to divide the 12 sub-regions into two sets of 6 sub-regions. That is, the reference voltage line V is disposed to traverse the center of the first subpixel area PXa and the second subpixel area PXb.

Each of the sub-regions includes one cross-shaped stem, based on which the sub regions are identified. Although each of the pixels shown in the exemplary embodiment of FIG. 2 is described as including 12 sub-regions, the present system and method are not limited thereto. Any number of sub-regions is possible.

Also, each of the first subpixel area PXa and the second subpixel area PXb includes six unit electrodes UP corresponding to the six sub-regions. The area of a unit electrode UP in the second subpixel area PXb may be equal to or larger than the area of a unit electrode in the first subpixel area PXa. Also, a voltage applied to the second subpixel area PXb may be lower than a voltage applied to the first subpixel area PXa.

Also, the gate line 121 extends between the two adjacent pixels PX1 and PX2 in the horizontal direction. Specifically, the gate line 121 extends between the second subpixel area PXb of pixel PX1 and the first subpixel area PXa of adjacent pixel PX2 in the horizontal direction.

A structure of a pixel electrode and a reference voltage line V in a pixel PX according to an exemplary embodiment of the present system and method is described below with reference to FIG. 3.

Figure 3:
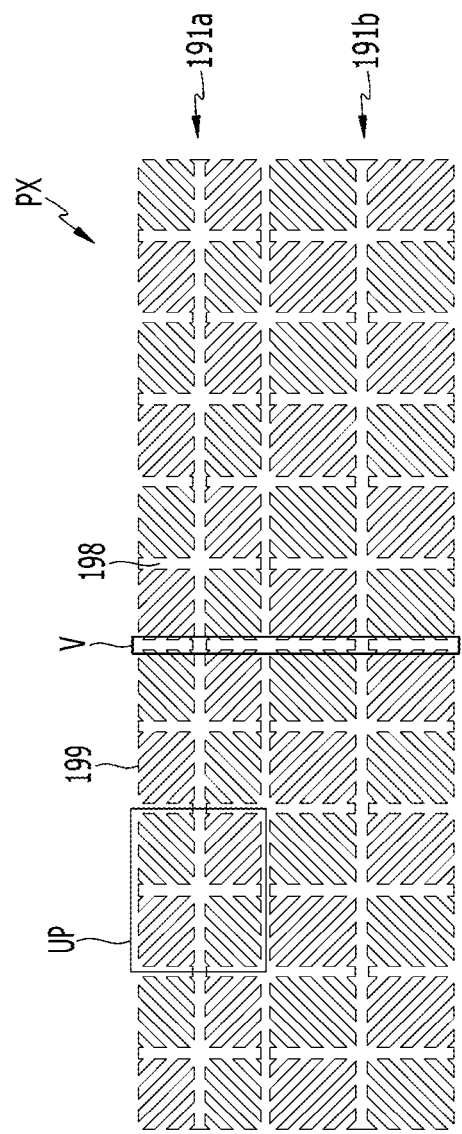
FIG. 3 is a layout view illustrating a pixel electrode according to an exemplary embodiment of the present system and method.

FIG. 3 is a layout view illustrating a pixel electrode according to an exemplary embodiment of the present system and method.

A pixel electrode disposed in one pixel PX includes a first subpixel electrode 191a disposed in the first subpixel area PXa and a second subpixel electrode 191b disposed in the second subpixel area PXb.

Each of the first subpixel electrode 191a and the second subpixel electrode 191b includes six unit pixel electrodes UP corresponding to six sub-regions. Each of the unit pixel electrodes UP includes a cross-shaped stem 198 and a plurality of fine branches 199 obliquely extending from the cross-shaped stem 198. The plurality of fine branches 199 may be formed at an angle of 45 degrees, an angle equal to or larger than 40 degrees, or an angle equal to or smaller than 50 degrees with respect to the horizontal direction or the vertical direction.

The six unit pixel electrodes UP of the first subpixel electrode 191a are connected to each other through an extension part. Likewise, the six unit pixel electrodes UP of the second subpixel electrode 191b are connected to each other through an extension part. In the exemplary embodiment of FIG. 3, the cross-shaped stems 198 are formed to be in contact with sides of a region where the unit pixel electrodes are formed.

The extension part of the unit pixel electrodes UP may extend from the cross-shaped stem 198. The six pixel electrodes UP that are connected by the extension part receive the same voltage. While the unit pixel electrodes of the same subpixel electrode are connected to one another through the extension part, unit pixel electrodes of different subpixel electrodes are separate from and not connected to each other.

An upper common electrode of one sub-region where the unit pixel electrodes UP are disposed is formed to have a plate shape, which is a plane shape that does not include an opening region.

The reference voltage line V is disposed to traverse the center of the first subpixel electrode 191a and the second subpixel electrode 191b.

An overall structure of a pixel having a pixel electrode, a common electrode, and a reference voltage line is described with reference to FIG. 4.

Figure 4:
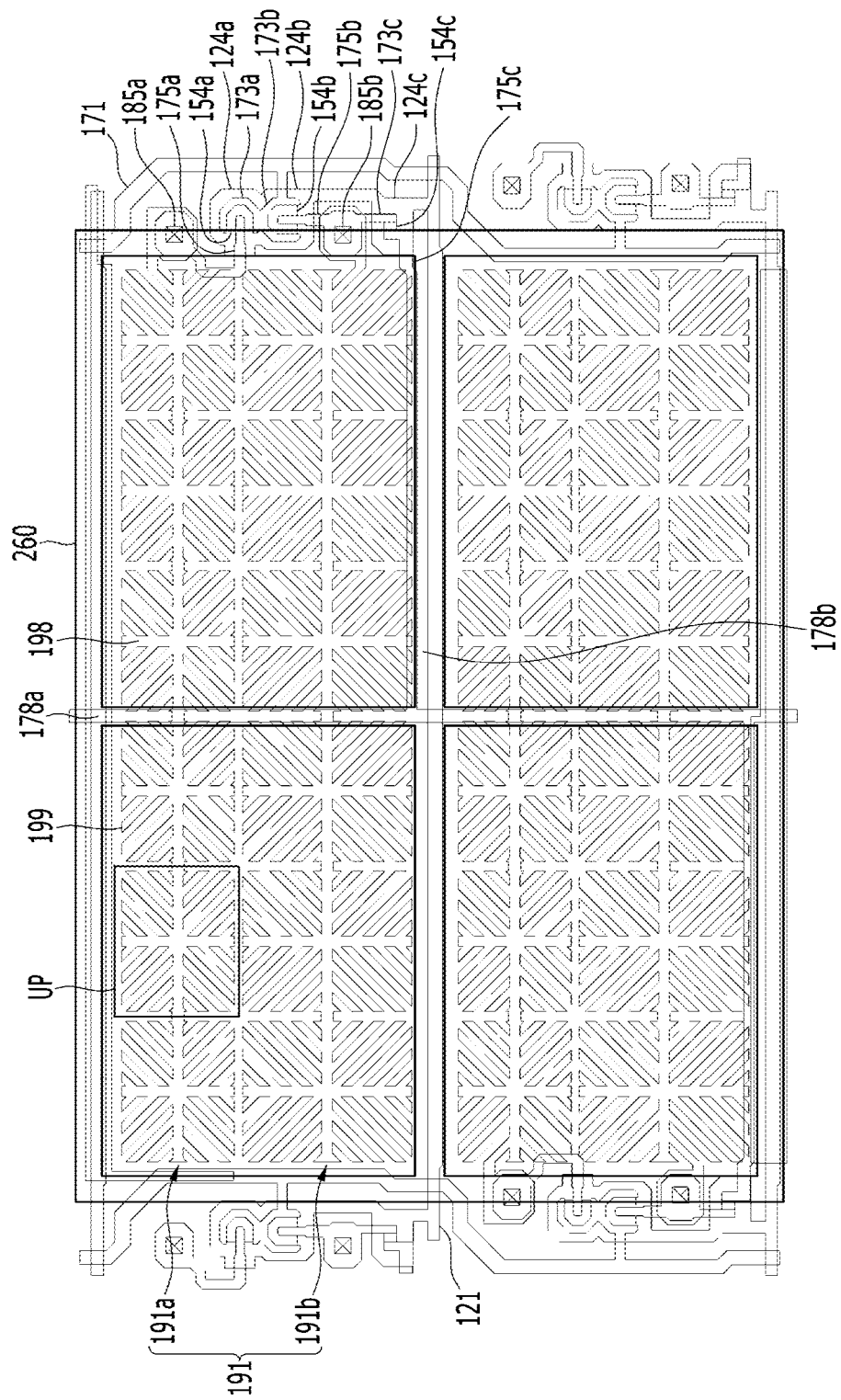
FIG. 4 is a layout view of two adjacent pixels of a liquid crystal display according to an exemplary embodiment of the present system and method.

FIG. 4 is a diagram showing a detailed structure of the pixel according to the exemplary embodiment of FIG. 3, and shows a layout view of two adjacent pixels of a liquid crystal display according to an exemplary embodiment of the present system and method.

Referring to FIG. 4, the liquid crystal display according to an exemplary embodiment of the present system and method includes a lower display panel and an upper display panel that face each other, and a liquid crystal layer disposed between the two panels.

First, as to the lower panel, a plurality of gate lines 121 is disposed on the lower panel.

The gate lines 121 extend among a plurality of pixel electrodes 191 in the horizontal direction, and include a first gate electrode 124a, a second gate electrode 124b, and a third gate electrode 124c that protrude upward (orientation as shown in FIG. 4) and extend from the gate lines 121. The first gate electrode 124a, the second gate electrode 124b, and the third gate electrode 124c are formed such that the third gate electrode 124c extends upward from the gate lines 121 and then expands, and the first gate electrode 124a and the second electrode 124b extend again from the third gate electrode 124c. The first gate electrode 124a and the second gate electrode 124 may be formed in one expanded region. Also, the gate lines 121 may include a bent portion that is bent from a main line extending in a substantially horizontal direction at periodic intervals.

A gate insulating layer is disposed on the gate lines 121. A first semiconductor 154a, a second semiconductor 154b, and a third semiconductor 154c are disposed respectively on the first gate electrode 124a, the second gate electrode 124b, and the third gate electrode 124c.

A data conductor including a data line 171, a first drain electrode 175a, a second drain electrode 175b, a third source electrode 173c, a third drain electrode 175c, and a reference voltage line 178 is disposed on the first semiconductor 154a, the second semiconductor 154b, and the third semiconductor 154c, and the gate insulating layer.

The data line 171 transfers a data voltage, substantially extends in the vertical direction on a lower substrate, and intersects with the gate lines 121. The data line 171 includes a source electrode 173a and a second source electrode 173b that respectively extend toward the first and second gate electrodes 124a and 124b.

The reference voltage line 178 may include a main line 178a substantially parallel to the data line 171 and a branch portion 178b extending from the main line 178a and substantially parallel to the gate lines 121. The branch portion 178b extends to the thin film formation region TA along the edges of the display area, and one end of the branch 178b forms the third drain electrode 175c.

The first drain electrode 175a faces the first source electrode 173a, the second drain electrode 175b faces the second source electrode 173b, and the third drain electrode 175c faces the third source electrode 173c. The third source electrode 173c is connected to the second drain electrode 175b.

The first gate electrode 124a, the first source electrode 173a, the first drain electrode 175a, and the first semiconductor 154a together form a first thin film transistor. The second gate electrode 124b, the second source electrode 173b, the second drain electrode 175b, and the second semiconductor 154b together form a second thin film transistor. The third gate electrode 124c, the third source electrode 173c, the third drain electrode 175c, and the third semiconductor 154c together form a third thin film transistor. That is, the first thin film transistor and the second thin film transistor receive a data voltage through their source electrodes, whereas the third thin film transistor receives a reference voltage through its source electrode.

A passivation layer is disposed on the data conductor, and a pixel electrode 191 is disposed on the passivation layer.

Each pixel electrode includes a first subpixel electrode 191a and a second subpixel electrode 191b as described with reference to FIG. 3.

The first drain electrode 175a of the first thin film transistor is connected to the first subpixel electrode 191a through a first contact hole 185a.

The second drain electrode 175b of the second thin film transistor is connected to the second subpixel electrode 191b through a second contact hole 185b.

A protrusion 260 is disposed on the subpixel electrodes 191a and 191b. The protrusion 160 may be disposed along the edges of the display area, which are the edges of the subpixel electrodes 191a and 191b, or may be disposed along the edges of the unit electrodes UP in one pixel.

The height of the protrusion 260 according to an exemplary embodiment of the present system and method may be formed to be lower than the height of the liquid crystal layer disposed between the upper panel and the lower panel.

The protrusion 260 formed along the edges of the display area and the unit electrodes controls the alignment of the liquid crystal molecules disposed in the display area and the unit electrodes, thereby providing improved controllability liquid crystal over the liquid crystal molecules. In particular, the protrusion 260 makes it possible to align the liquid crystal molecules in the same direction as the liquid crystal molecules aligned by the fine branches 199.

Although the protrusion is shown as overlapping the edges of the display area and the reference voltage line in the exemplary embodiment of FIG. 4, the present system and method are not limited thereto, and the protrusion may be selectively formed at the edges of unit electrodes.

In some exemplary embodiments, a column spacer (not shown) may be disposed on the pixel electrodes 191a and 191b. The column spacer may maintain a gap between the upper panel and the lower panel according to a height. The column spacer may be formed of the same material and through the same process as the protrusion 260. Therefore, the column spacer and the protrusion may be disposed in the same layer.

Next, a color filter and a light blocking member may be disposed on the upper panel (not shown).

The light blocking member may be called a black matrix, and may block light leakage between the pixel electrodes 191. The light blocking member may cover most of the data line 171, the gate lines 121, and the thin film transistors.

The color filter may display one of several primary colors, such as three primary colors of red, green, and blue. According to another exemplary embodiment of the present system and method, at least one of the light blocking member and the color filter may be disposed in the lower panel.

An overcoat is disposed on the color filter and the light blocking member, and an upper common electrode is disposed on the overcoat. The upper common electrode, which receives a common voltage Vcom, may be formed to have a plate shape as described with reference to FIG. 3.

The liquid crystal layer disposed between the lower panel and the upper panel includes liquid crystal molecules having negative dielectric anisotropy. That is, the liquid crystal molecules may be aligned such that a main axis thereof is substantially perpendicular to surfaces of the two panels when an electric field is not being applied. The liquid crystal layer may not include reactive mesogen (RM).

Although not shown, the liquid crystal display according to an exemplary embodiment of the present system and method includes a first alignment layer and a second alignment layer disposed on the pixel electrode and the common electrode.

In this case, the first alignment layer and the second alignment layer may be different from each other. As an example, the alignment layer disposed on the pixel electrode may further include reactive mesogen (RM).

Although the color filter and the light blocking member are described above as being disposed in the upper panel, the present system and method are not limited thereto, and one of the color filter and the light blocking member may be disposed in the lower panel, or both of the color filter and the light blocking member may be disposed in the lower panel.

The liquid crystal display according to an exemplary embodiment of the present system and method may have a curved shape, and as a result, the upper and lower panels may be misaligned with each other. According to exemplary embodiments of the present system and method, the common electrode disposed on the upper panel is formed to have a plate shape and the protrusion, which assists the alignment of the liquid crystal molecules, is disposed in the lower panel. In this manner, the alignment of the liquid crystal molecules is easily controlled despite the misalignment. Therefore, exemplary embodiments of the present system and method make it possible to suppress texture generation and provide a display device having improved display quality.

Figure 5:
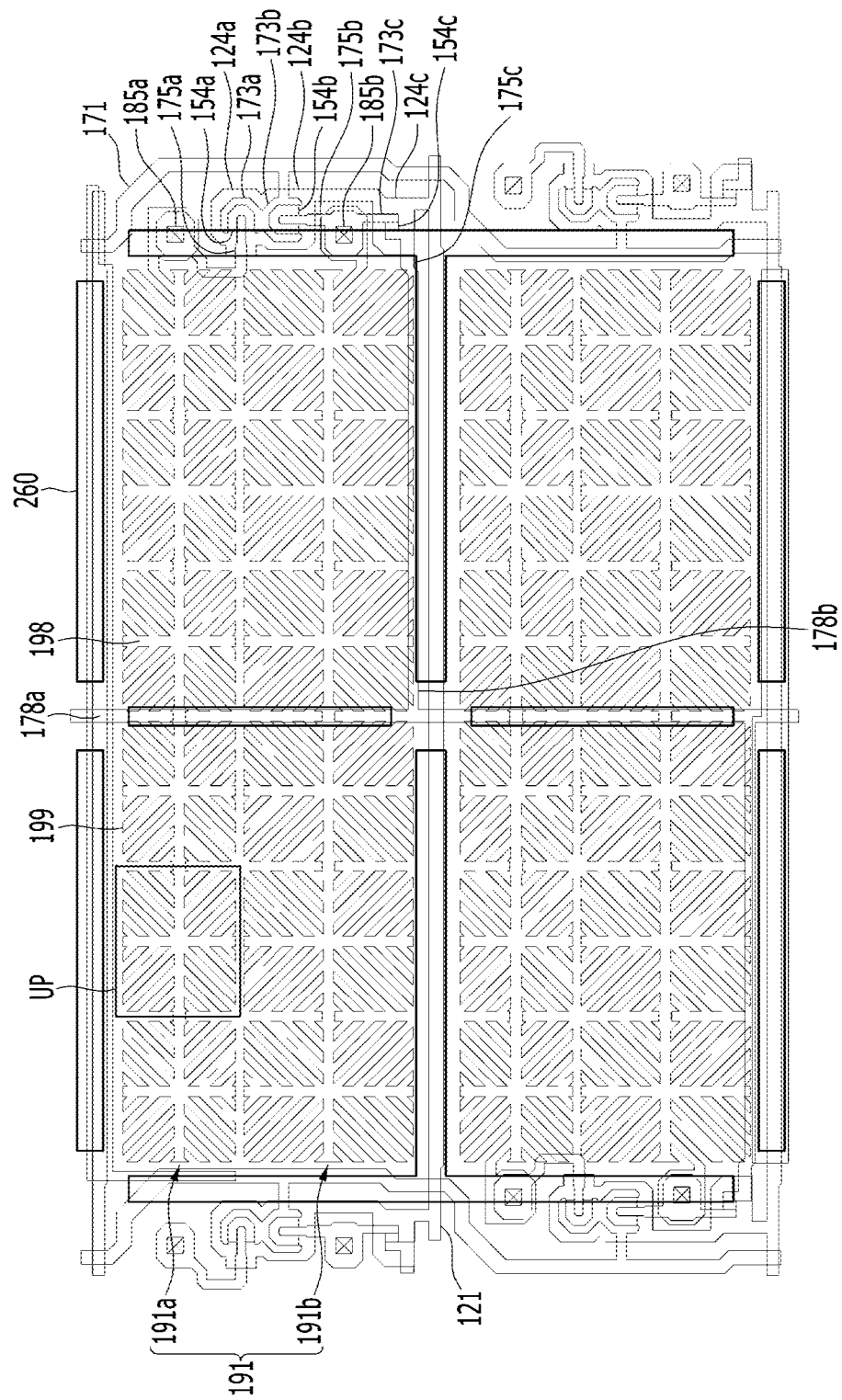
FIGS. 5, 6 and 7 are layout views of two adjacent pixels of a liquid crystal display according to another exemplary embodiment of the present system and method.
Figure 6:
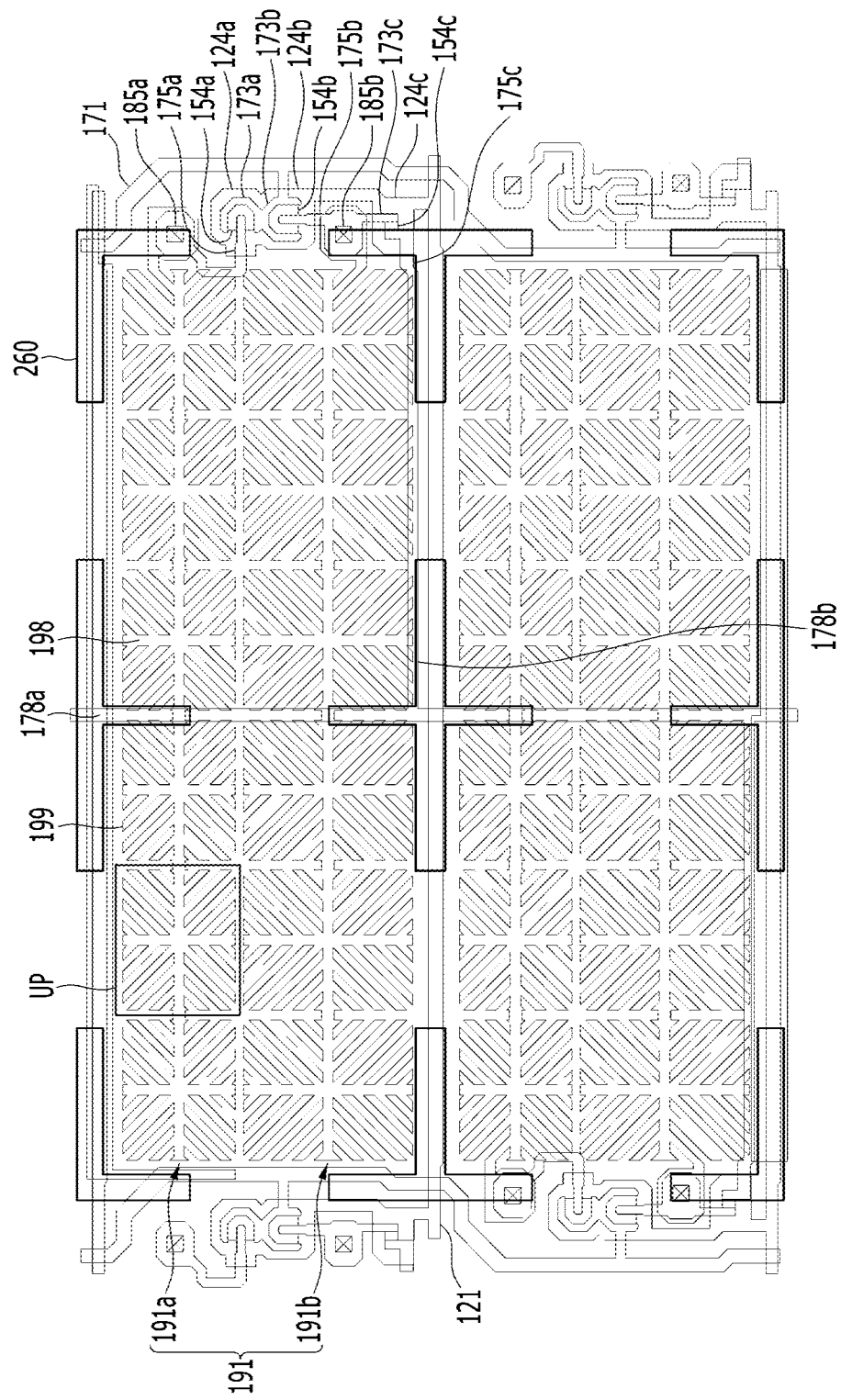
Figure 7:
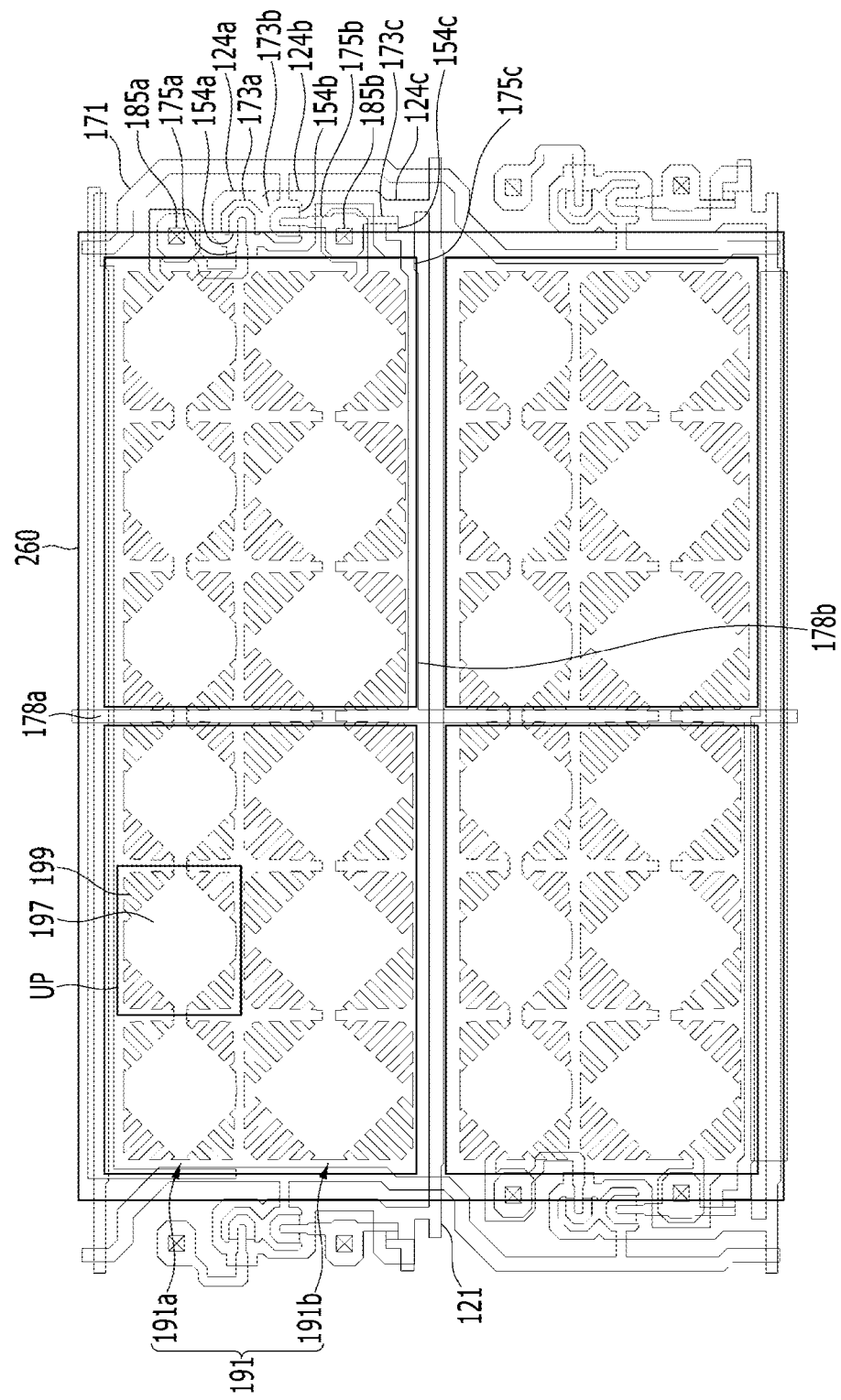

Hereinafter, other embodiments of the present system and method are described with reference to FIGS. 5 to 7. FIGS. 5 to 7 are layout views of two adjacent pixels of a liquid crystal display according to other exemplary embodiments of the present system and method. The liquid crystal display according to the exemplary embodiments of FIGS. 5 and 6 is identical to the above-described exemplary embodiment of FIG. 4 except for the shape and arrangement of the protrusion. The liquid crystal display according to the embodiment of FIG. 7 differs from that of FIG. 4 in the structure of the subpixel electrodes 191a and 192b. To avoid redundancy of description, the description of the same or similar elements is omitted.

First, referring to FIG. 5, a protrusion 260 is disposed on subpixel electrodes 191a and 191b. The protrusion 260 may be disposed along the edges of the display area, which are the edges of the subpixel electrodes 191a and 191b, or may be disposed along the edges of the unit electrodes UP in one pixel.

The protrusion 260 according to another exemplary embodiment of the present system and method may include openings disposed at its corners. Specifically, the protrusion 260 formed along the edges of the display area or the unit electrodes may have a rectangular plane shape and may be formed such that portions of the protrusion 260 at the corners are removed or not formed in the rectangular shape. This protrusion structure allows the liquid crystal molecules to easily move through the openings during a process of manufacturing the liquid crystal display.

The height of the protrusion 260 according to an exemplary embodiment of the present system may be formed to be lower than the height of the liquid crystal layer disposed between the upper panel and the second panel.

The protrusion 260 formed along the edges of the display area and the unit electrodes controls the alignment of the liquid crystal molecules disposed in the display area and the unit electrodes, thereby providing improved controllability over the liquid crystal molecules. In particular, the protrusion makes it possible to align the liquid crystal molecules in the same direction as the liquid crystal molecules aligned by the fine branches 199.

Although the protrusion is shown as overlapping the edges of the display area and the reference voltage line in the exemplary embodiment, the present system and method are not limited thereto, and the protrusion may be selectively formed at the edges of unit electrodes.

Referring to FIG. 6, unlike the exemplary embodiment of FIG. 5, the protrusion 260 may include openings disposed at its edges instead of its corners.

The protrusion 260 is formed along the edges of the display area or the sub-regions and may have a rectangular plane shape. In this case, portions of the sides of the rectangular plane shape may be removed or not formed so as to be opened. The openings make movement of the liquid crystal molecules easy during the process of manufacturing the liquid crystal display, while the protrusion 260 is still able to assist in controlling the alignment of the liquid crystal molecules.

Referring to FIG. 7, the pixel electrode 191 may include a first subpixel electrode 191a and a second subpixel electrode 191b that are disposed within one pixel PX.

Each of the first subpixel electrode 191a and the second subpixel electrode 191b includes six unit pixel electrodes UP corresponding to six sub-regions. Each of the unit pixel electrodes UP includes a plate part 197 and a plurality of fine branches 199 extending outward from the sides of the plate part 197. The plurality of fine branches 199 may be formed at an angle of 45 degrees with respect to the horizontal direction or the vertical direction or may be formed at an angle equal to or larger than 40 degrees or an angle equal to or smaller than 50 degrees. Also, the fine branches 199 may extend perpendicularly from the sides of the plate part 197. Controllability of the liquid crystal molecules is enhanced through fringe fields generated at the sides of the edges of the plate part 197, thereby further increasing the transmittance of the liquid crystal display.

The six unit pixel electrodes of the first subpixel electrode 191a are connected to each other through an extension part. Similarly, the six unit pixel electrodes of the second subpixel electrode 191b are connected to each other through an extension part. Although the plate part 197 is illustrated as having a size in which the plate part 197 is in contact with the sides of a region where the unit pixel electrodes are formed, the plate part 197 may be formed to be smaller. In such case, the fine branches 199 may also be disposed at the corners of the plate part 197. The extension part of the unit pixel electrodes UP may extend from the plate part 197 or may extend from the fine branches 199. The six pixel electrodes UP that are connected by the extension part receive the same voltage. While the respective unit pixel electrodes of the same subpixel electrode are connected to one another through the extension part, unit pixel electrodes of different subpixel electrodes are separate from and not connected to each other.

The common electrode 270 according to another exemplary embodiment of the present system and method is formed to have a plate shape and does not include a separate pattern or slit.

The reference voltage line 178 is disposed to traverse the center of the first subpixel electrode 191a and the second subpixel electrode 191b.

A protrusion 260 is disposed on the subpixel electrodes 191a and 191b. The protrusion 260 may be disposed along the edges of the display area, which are edges of the subpixel electrodes 191a and 191b, or may be disposed along the edges of the unit electrodes UP in one pixel. The protrusion 260 according to the various exemplary embodiments described above may be disposed without limitation, for example, in the embodiment of FIG. 7.

Although the shape of the pixel electrode is specified as illustrated in FIG. 7, the present system and method are not limited thereto, and various shapes of the pixel electrode are possible.

Figure 8:
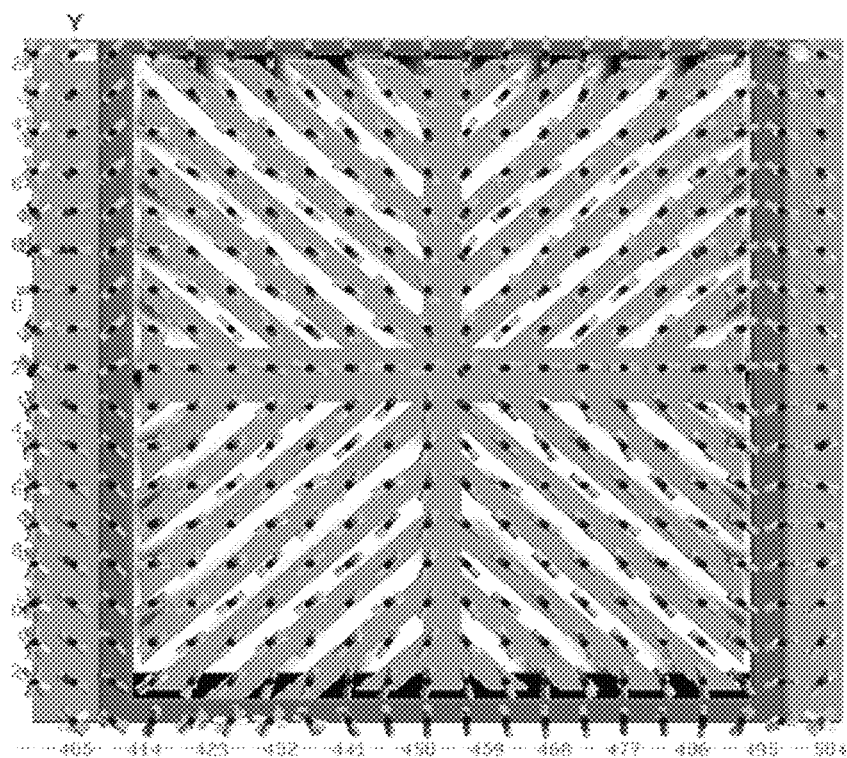
FIG. 8 is a liquid crystal molecule alignment image of a portion of one pixel according to an exemplary embodiment of the present system and method.
Figure 9:
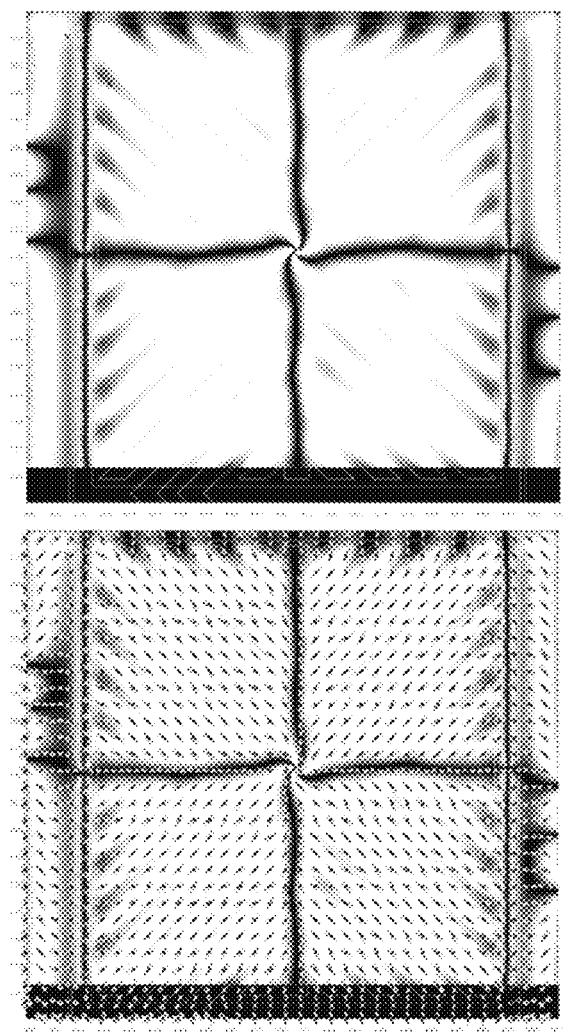
FIGS. 9, 10 and 11 are liquid crystal molecule alignment images of a portion of one pixel according to various exemplary embodiments of the present system and method.
Figure 10:
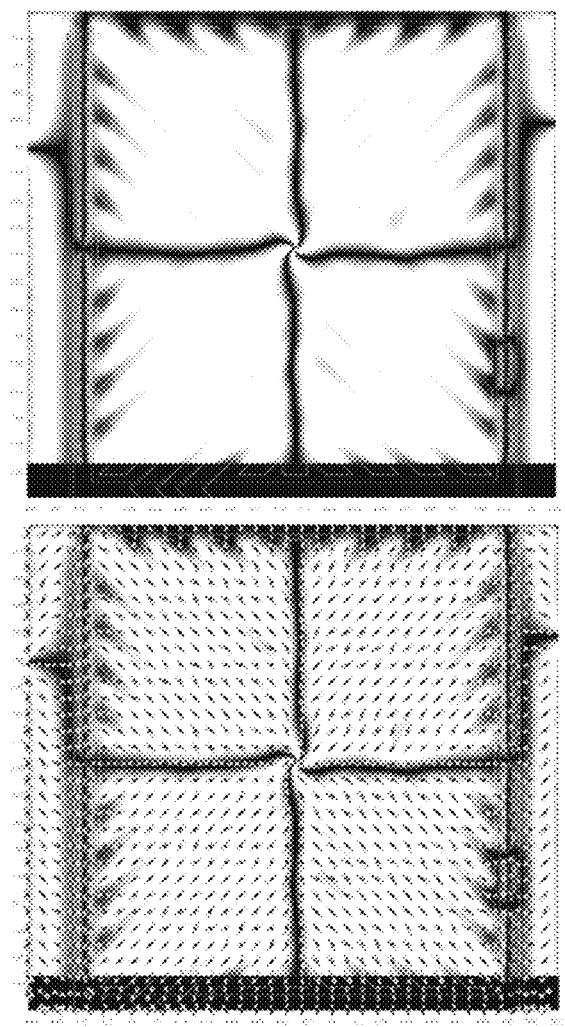
Figure 11:
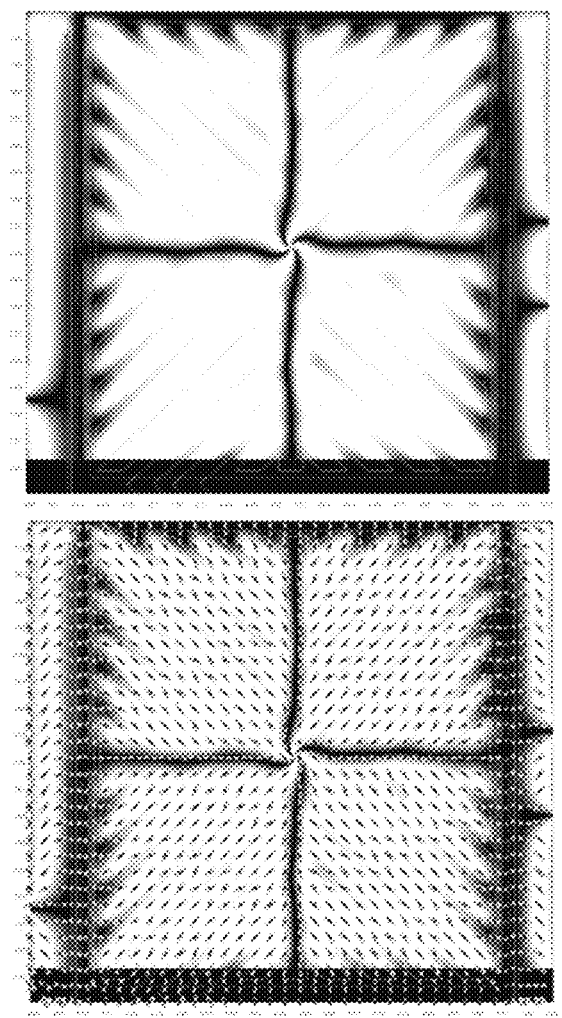

Hereinafter, liquid crystal alignment images according to embodiments of the present system and method are described with reference to FIGS. 8 to 10. FIG. 8 is a liquid crystal molecule alignment image of a portion of one pixel according to an exemplary embodiment of the present system and method. FIGS. 9 to 11 are liquid crystal molecule alignment images of a portion of one pixel according to various exemplary embodiment of the present system and method.

First, referring to FIG. 8, the liquid crystal molecule alignment image of a sub-region shows a cross-shaped stem, a plurality of fine branches extending therefrom, and a protrusion surrounding the edges of the fine branches, according to an exemplary embodiment.

As can be seen from FIG. 9, the liquid crystal molecules disposed over the fine branches are generally aligned in the direction in which the fine branches extend. Moreover, the liquid crystal molecules disposed around the protrusion are also aligned in the same direction as those liquid crystal molecules aligned by the fine branches.

That is, according to an exemplary embodiment of the present system and method, although the influence of the fine branches are weaker near the edges of the sub-regions, the protrusion helps to align the liquid crystal molecules near the edges of the sub-regions in the same direction as the liquid crystal molecules that are disposed over and aligned by the fine branches.

FIG. 9 is a liquid crystal molecule alignment image when the height of the protrusion according to an exemplary embodiment of the present system and method is 0.5 μm. FIG. 10 is a liquid crystal molecule alignment image when the height of the protrusion is 1.0 μm. FIG. 11 is a liquid crystal molecule alignment image when the height of the protrusion is 1.5 μm.

Referring to FIGS. 9 to 11, it can be seen that the liquid crystal molecules are aligned along the extension directions of the fine branches around the cross-shaped stem, and in particular, liquid crystal molecules disposed around the edges are aligned in the directions of the cross-shaped stem and the fine branches due to the protrusion disposed at the edges of the sub-regions.

That is, as shown in FIGS. 9 to 11, the liquid crystal molecules alignment directions due to the protrusion are identical to the liquid crystal molecules alignment directions due to the fine branches and the cross-shaped stem, and more effective liquid crystal control is possible at the edges of the sub-regions by means of the protrusion.

As described above, the liquid crystal display according to the exemplary embodiments of the present system and method is capable of effectively controlling liquid crystal molecules by means of the protrusion disposed in the lower panel even in a case in which the common electrode disposed in the upper panel is formed in a plate form. Therefore, it is possible to provide a liquid crystal display having an improved display quality.

While the present system and method are described in connection with exemplary embodiments, the present system and method are not limited to the disclosed embodiments. On the contrary, the present system and method cover various modifications and equivalent arrangements included within the spirit and scope of the appended claims.

<Description of symbols>

| | |
|---|---|
| 121: Gate line | 124: Gate electrode |
| 154: Semiconductor | 171: Data line |
| 173: Source electrode | 175: Drain electrode |
| 178: Reference voltage line | 191: Pixel electrode |
| 198: Cross-shaped stem | 199: Fine branch |
| 400: Gate driver | |

What is claimed is:

1. A liquid crystal display comprising:
a first insulation substrate,
a thin film transistor disposed on the first insulation substrate,
a pixel electrode connected to the thin film transistor,
a protrusion disposed on the pixel electrode,
a second insulation substrate facing the first insulation substrate,
a common electrode disposed on the second insulation substrate,
a reference voltage line, and
a liquid crystal layer disposed between the pixel electrode and the common electrode,
wherein a pixel includes a thin film transistor formation region where the thin film transistor is disposed and a display area where the pixel electrode is disposed,
the protrusion is disposed to overlay at least a portion of edges of the display area,
the reference voltage line and the protrusion overlap each other in a plan view, and
the display area includes a plurality of sub-regions and the reference voltage line is disposed along the center of the display area to divide the plurality of sub-regions into two sets of sub-regions, and the protrusion includes an opening disposed at corners of the edges.

2. The liquid crystal display of claim 1,
further comprising a column spacer disposed on the pixel electrode,
wherein the column spacer and the protrusion are disposed in the same layer and are made of the same material.

3. The liquid crystal display of claim 1, wherein:
the protrusion has a height lower than a height of the liquid crystal layer.

4. The liquid crystal display of claim 1, wherein:
the common electrode has a plate shape.

5. The liquid crystal display of claim 1,
further comprising alignment layers disposed on the pixel electrode and the common electrode,
wherein the alignment layers disposed on the pixel electrode further include a reactive mesogen (RM).

6. The liquid crystal display of claim 1, wherein: the liquid crystal layer excludes a reactive mesogen (RM).

7. The liquid crystal display of claim 1, wherein:
the liquid crystal display has a curved shape.

8. The liquid crystal display of claim 1, wherein the pixel electrode comprises a first side parallel to an extending direction of a gate line and a second side parallel to an extending direction of a data line, and the first side is longer than the second side.

9. The liquid crystal display of claim 1, wherein:
the pixel electrode further comprises a plurality of unit pixel electrodes, a plate part being disposed at each center of the plurality of unit pixel electrodes.

10. The liquid crystal display of claim 9, wherein:
the plate part has a diamond shape.

11. The liquid crystal display of claim 1, wherein:
the pixel electrode comprises,
a plurality of cross-shaped stems, and
fine branches obliquely extending from the cross-shaped stems, and the display area includes a plurality of sub-regions identified by the cross-shaped stems.

12. The liquid crystal display of claim 11, wherein:
the protrusion overlays at least a portion of edges of the sub-regions.

13. The liquid crystal display of claim 12, wherein:
the protrusion includes an opening disposed at sides of the edges.

14. A liquid crystal display comprising:
a first insulation substrate;
a gate line extending along a first direction;
a data line extending along a second direction crossing the first direction;
a thin film transistor connected to the gate line and the data line;
a pixel electrode connected to the thin film transistor;
a protrusion disposed on the pixel electrode;
a second insulation substrate facing the first insulation substrate;
a common electrode disposed on the second insulation substrate;
a column spacer disposed between the first insulation substrate and the second insulation substrate to maintain a gap between the first insulation substrate and the second insulation substrate; and
a liquid crystal layer disposed between the pixel electrode and the common electrode,
wherein the protrusion is disposed between the pixel electrode and the common electrode, has a height lower than that of the column spacer and comprises a first portion overlapping the gate line and a second portion overlapping the data line, wherein the pixel electrode comprises a plurality of sub-regions electrically connected to each other, each of the sub-regions comprising a cross-shaped stem, and wherein the protrusion further comprises a third portion extending along and overlapping a boundary between adjacent sub-regions of the plurality of sub-regions.

15. The liquid crystal display of claim 14, wherein at least one of the first portion or the second portion has an opening extending along the first direction or the second direction.

16. The liquid crystal display of claim 14, wherein the first portion extends along the first direction and the second portion extends along the second direction.

17. The liquid crystal display of claim 14, wherein a length of the pixel electrode along the first direction is larger than a length of the pixel electrode along the second direction.

18. The liquid crystal display of claim 14, wherein a length of the first portion overlapping one pixel is larger than a length of the second portion overlapping the one pixel.

19. The liquid crystal display of claim 14, wherein a combined perimeter of the first portion and the second portion forms a substantially rectangular shape in a plan view.

* * * * *